(12) United States Patent
Elferich (10) Patent No.: US 8,174,851 B2
(45) Date of Patent: May 8, 2012

(54) METHOD FOR OPERATING A RESONANT POWER CONVERTER

(75) Inventor: Reinhold Elferich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 242 days.

(21) Appl. No.: 12/302,898

(22) PCT Filed: Jun. 15, 2007

(86) PCT No.: PCT/IB2007/052281
§ 371 (c)(1),
(2), (4) Date: Dec. 1, 2008

(87) PCT Pub. No.: WO2007/148271
PCT Pub. Date: Dec. 27, 2007

(65) Prior Publication Data
US 2009/0316442 A1    Dec. 24, 2009

(30) Foreign Application Priority Data
Jun. 20, 2006 (EP) .................................. 06115697

(51) Int. Cl.
*H02M 3/335* (2006.01)
*H02M 7/523* (2006.01)

(52) U.S. Cl. ...................... 363/21.02; 363/17; 363/21.03

(58) Field of Classification Search ............... 363/17, 363/21.02, 21.03, 89
See application file for complete search history.

(56) References Cited

U.S. PATENT DOCUMENTS

| | | | |
|---|---|---|---|
| 5,920,466 A * | 7/1999 | Hirahara | 363/21.02 |
| 6,018,467 A | 1/2000 | Majid et al. | |
| 6,341,073 B1 | 1/2002 | Lee | |
| 6,344,979 B1 | 2/2002 | Huang et al. | |
| 7,339,800 B2 * | 3/2008 | Fukumoto | 363/21.02 |
| 2002/0001203 A1* | 1/2002 | Jitaru | 363/17 |
| 2003/0214821 A1* | 11/2003 | Giannopoulos et al. | 363/21.02 |
| 2004/0184289 A1 | 9/2004 | Vinciarelli | |
| 2004/0264214 A1 | 12/2004 | Xu et al. | |
| 2005/0068792 A1 | 3/2005 | Yasumura | |
| 2005/0099827 A1 | 5/2005 | Sase et al. | |
| 2008/0266908 A1* | 10/2008 | Halberstadt | 363/21.02 |
| 2009/0244934 A1* | 10/2009 | Wang et al. | 363/21.06 |

FOREIGN PATENT DOCUMENTS

| | | |
|---|---|---|
| EP | 1501177 A2 | 1/2005 |
| JP | 2005192368 | 7/2005 |
| JP | 2005198438 | 7/2005 |
| WO | 2005112238 A2 | 11/2005 |

* cited by examiner

*Primary Examiner* — Adolf Berhane
*Assistant Examiner* — Fred E Finch, III (57) ABSTRACT

According to an exemplary embodiment a method of operating a resonant power supply comprises controlling the resonant power supply in a discontinuous way. According to an exemplary embodiment a resonant power supply comprises a first switching element, and at least one energy storing element, wherein the resonant power supply is adapted to be controlled in a discontinuous way.

20 Claims, 10 Drawing Sheets

METHOD FOR OPERATING A RESONANT POWER CONVERTER

This application is a national stage application under 35 U.S.C. §371 of International Application No. PCT/IB2007/052281 filed on Jun. 15, 2007, and published in the English language on Dec. 27, 2007, as International Publication No. WO/2007/148271, which claims priority to European Application No. 06115697.2, filed on Jun. 20, 2006, incorporated herein by reference.

The present invention relates to a method of operating a resonant power converter, a resonant power converter, a computer readable medium and a program element. In particular, the invention relates to a low loss standby operation method of a resonant type of power supply.

Low Power Standby (LPS) functionality in high volume applications, such as consumer or office electronics, using a resonant power supply is quite new. Several concepts have been looked at in the prior art for standby operation for a resonant type of power supply (typically an LLC type of converter, i.e. an inductivity-inductivity-capacity converter, an LCC type converter, i.e. an inductivity-capacity-capacity converter or an LLCC type of converter, i.e. an inductivity-inductivity-capacity-capacity converter).

In a first concept, the power supply operates close to its no-load point. As a consequence, in case of a maximum mains voltage maximum switching frequency for the resonant type of power supply, there still will be considerable reactive current causing losses in the half-bridge and in the transformer (particularly in designs aiming at world-wide mains). These losses will be due to frequency dependency of losses in a driver and in a transformer of such a power supply. The losses in this mode may be a multiple of the required standby power.

In a second concept the resonant type of power supply operates in a burst mode operation. In this case the resonant type of power supply is completely switched on periodically. During a switch on process, hard switching cannot be avoided which leads to a quite lossy process. Furthermore, a control loop in a burst mode operation locks only after a while in which timeslot no power can be converted. This further decreases efficiency of power conversion and it requires larger output filter.

A last concept requires an additional converter that is only operational in stand-by mode. Obviously this brings additional components and costs.

There may be a need for method of operating a resonant power converter, a resonant power converter, a computer readable medium and a program element which method and resonant power converter enables a standby operation exhibiting low power loss, in particular when driving low loads.

This need may be met by a method of operating a resonant power converter, a resonant power converter, a computer readable medium and a program element according to the independent claims.

According to an exemplary embodiment a method of operating a resonant power supply comprises controlling the resonant power supply in a discontinuous way.

According to an exemplary embodiment a resonant power supply comprises a first switching element, and at least one energy storing element, wherein the resonant power supply is adapted to be controlled in a discontinuous way.

According to an exemplary embodiment a computer readable medium is provided in which a program for controlling a resonant power supply is stored, which program, when executed by a processor, is adapted to control a method comprising controlling the resonant power supply in a discontinuous way.

According to an exemplary embodiment a program element for controlling a resonant power supply is provided, which program, when executed by a processor, is adapted to control a method comprising controlling the resonant power supply in a discontinuous way.

Known resonant power supplies and control methods of such resonant power supplies depend on the fact that cycles of energy transfer periods are repeated, i.e. after a first period of energy transfer controlled by the method the same controlling steps are repeated. In particular, switches e.g. transistors are switched again and again while no stopping of this switching without loss is possible during the operation of the resonant power supply. In case of a so-called Inductivity-Inductivity-Capacity converter (LLC converter) the switches of a primary side half-bridge of the LLC converter are continuously switched and the sum of energy stored in the inductivity and the capacity does not equal zero.

Contrary thereto, according to an exemplary embodiment a method of discontinuous switching is provided. That is, after an initial initialization it is possible to lossless stop switching of switching elements of a primary half-bridge in case of an LLC converter. In particular, it is possible in the controlling to stop the switching at defined point of the switching. These points are the time points in which the state diagram showing the voltage and the current of the capacity of the resonant power supply system is in the point of origin. Further, in case of an LLC converter generally the energy continuously oscillates between different resonant elements of the LLC converter, e.g. the inductivity and the capacity of the LLC converter. In particular, the sum of the energy stored in the inductivity and the capacity may be zero.

According to the exemplary embodiment of the method it may be possible to achieve good efficiency values even for standby loads which are very small, e.g. zero output power. This may be possible without the implementation of additional components, but only by choosing a more elaborate control method, i.e. a control method which discontinuously switches the switching elements of the resonant power supply.

In the following further exemplary embodiments of the method of operating a resonant power supply are described. However, these embodiments also apply for the resonant power supply, the computer readable medium and the program element.

According to another exemplary embodiment of the method the a resonant power supply comprising a first switching element, at least one energy storing element, and the discontinuous controlling comprises initializing a standby operation by transferring energy from the at least one energy storing element to the first switching element in such a way that soft switching of the first switching element is performable. Preferably, the method further comprises soft switching the first switching element, e.g. a zero voltage switching.

The first switching element may be a first transistor having a parallel connected diode, of a primary half-bridge of an LLC converter and the at least one energy storing element may be an output filter of the LLC converter. In particular, the first switching element may be implemented as a MOSEFT transistor in which case the integrally formed diode of the MOSFET may be used as the described diode. By transferring energy from a storing element of the LLC converter to the first transistor of the LLC converter it may be possible to induce a small current in the diode parallel to the first transistor. This current may be great enough so that a zero voltage switching of the first transistor is possible leading to a low loss scenario even in case of a small load at the output filter. In other words, in advance to a first primary side switching event, energy is transferred from a first energy storing element to the first switching element, which may be a part of a resonant circuit. This energy may be just enough for soft-switching the primary side.

According to another exemplary embodiment of the method the resonant power supply comprises a rectifier comprising a second switching element and an output filter, wherein the energy is transferred from the output filter to the first switching element by switching the second switching element. The rectifier may be a synchronous rectifier and, the second switching element may be a second switching transistor, e.g. a MOSFET.

The output filter may be the first energy storing element of the resonant power supply, which is used to provide the energy for the first switching element so that this first switching element can be soft-switched.

According to another exemplary embodiment the method further comprises a Resonant State Commutation phase, wherein in the Resonant State Commutation preferably a current flowing through the resonant power supply is inversed.

In the Resonant State Commutation a current iC flowing through the resonant power supply immediately after the initialization of the standby changes to –iC. That is, the duration of this phase is half a period of the resonant power supply. In this time the resonant power supply may perform a free oscillation of a half period.

According to another exemplary embodiment the method further comprises increasing an output power of the resonant power supply by inserting power pulses. Preferably, the power pulses are inserted after the Resonant State Commutation phase. In particular, the power pulses may be inserted (embedded) between consecutive Resonant State Commutation phases.

By inserting so-called power pulses or power phases, in which additionally energy may be injected into the resonant power supply and thus to the output of the resonant power supply, it may be possible to provide for higher standby power demands of the resonant power supply. These power pulses may be one or more switching events of the first switching element, e.g. of the switching elements of the primary side of the resonant power supply.

According to another exemplary embodiment the method further comprises a Zero State Return phase, wherein in the Zero State Return preferably the initial state is reconstructed. Preferably, in the Zero State Return the energy transferred in the initialization is substantially returned to the first energy storing element.

In particular, the energy which is transferred from the first energy storing element to the first switching element in the initialization phase may be essentially transferred back to the first energy storing element, i.e. more or less all energy is transferred back, but small amounts which relates to losses due to impedance in the resonant power supply. In particular no losses due to hard-switching may be introduced. This Zero State Return phase is preferably performed at the end of the Resonant State Commutation phase and substantially all resonant energy flows back to the first energy storing element. In case of an LLC converter the energy flows back to both the output and the input filter, while the net energy flow to the output may be a matter of timing and may be controlled by a signal derived from the resonant capacitor voltage.

In the following further exemplary embodiments of the resonant power converter are described. However, these embodiments also apply for the method of operating a resonant power supply, the computer readable medium and the program element.

According to another exemplary embodiment of the resonant power supply the resonant power supply is further adapted to transfer energy initializing a standby operation from the at least one energy storing element to the first switching element in such a way that soft switching of the first switching element is performable.

According to another exemplary embodiment the resonant power supply further comprises a rectifier comprising a second switching element, and an output filter, wherein the second switching element is adapted to initialize the energy transfer from the output filter to the first switching element. Preferably, the rectifier is a synchronous rectifier.

By using a synchronous rectifier. It might be possible to reduce a voltage drop in the forward direction of the resonant power supply. Preferably, the synchronous rectifier comprises a MOSFET which is driven so as to mimic a diode. Contrary to the synchronous rectifiers used in LLC converters according to the prior art, the synchronous rectifier in an resonant power supply according to an exemplary embodiment is driven in such a way that a current, i.e. energy, flows from the output filter to the primary side in order to enable soft-switching of the primary side.

According to another exemplary embodiment of the resonant power supply the resonant power supply is formed as an LLC-converter comprising a half-bridge. Alternatively or additionally, the LLC converter may comprise a full-bridge.

In case of using a full-bridge for the LLC converter the energy continuously oscillates between different resonant elements of the LLC converter, e.g. the inductivity and the capacity of the LLC converter, while the sum of the energy stored in the inductivity and the capacity may not equal zero.

According to another exemplary embodiment the resonant power further comprises a second output filter, and the resonant power supply is adapted to standby-supplying both output filters.

That is, an LLC-converter may comprise two half-wave rectified output which are energized subsequently by corresponding half-waves of the output current io. Both outputs, may thus be standby-supplied, if periodically switching between normal and inverted operation.

One aspect of an exemplary embodiment a control method of a resonant power supply or resonant converter is provided. This method may provide a modified standby operation and its control, which runs the resonant converter still efficiently at greatly reduced standby loads and which does not depend on additional components. It may achieve a Zero State Return switching and bi-directional power conversion. The latter may be possible by making use of a synchronous rectifier switching, which may comprises: In advance to a first primary side switching event, energy is transferred trough the synchronous rectifier from an output filter to the resonant circuit; just enough for soft switching the primary side and thus to further charging the resonant capacity yet by an input filter. After waiting half an oscillation period, a "Zero State Return" switching event is performed, in which (substantially) all the resonant energy flows back to both the input and the output filter. The net energy flow to the output is a matter of timing and can be controlled by a signal derived from the resonant capacitor voltage. In case of higher standby power demands, one or more power pulses can be inserted between the above described Resonant State Commutation phases, which starts under soft-switching conditions and keeps such for the next event.

According to this aspect losses of integrated standby may be reduced to a minimum, which could be achieved without any extra power components or separate converters. A large range of standby power demand from virtually zero, e.g. 1 mW, to watts may be possible, i.e. light load operation may be covered. Also standby power demands of zero or small negative values may be coverable when using a resonant power supply according to the present invention. No error signal transfer via isolation may be required. Further, primary side driving by sensing, e.g. capacitor voltage only and secondary side driving by sensing output voltage may be possible. Furthermore, this operation may be applicable to all LLC converters with one or two controlled outputs.

A method of controlling a resonant power supply may be used in power supplies units of CE products like adapters for mobile PCs or LCD-Monitors, LCD-TV sets, DVD-X, set-top boxes, satellite-receivers, Fax and alike and for controller/driver/half-bridge ICs for those power supplies.

These and other aspects of the invention will be apparent from and will be elucidated with reference to the embodiments described hereinafter. All of the embodiments and aspects described herein can be mixed and combined with each other.

The present invention will now be described in more detail, by way of example, with reference to the accompanying drawings, wherein.

Throughout the drawings, the same reference numeral refers to the same element, or an element that performs substantially the same function.

Figure 1:
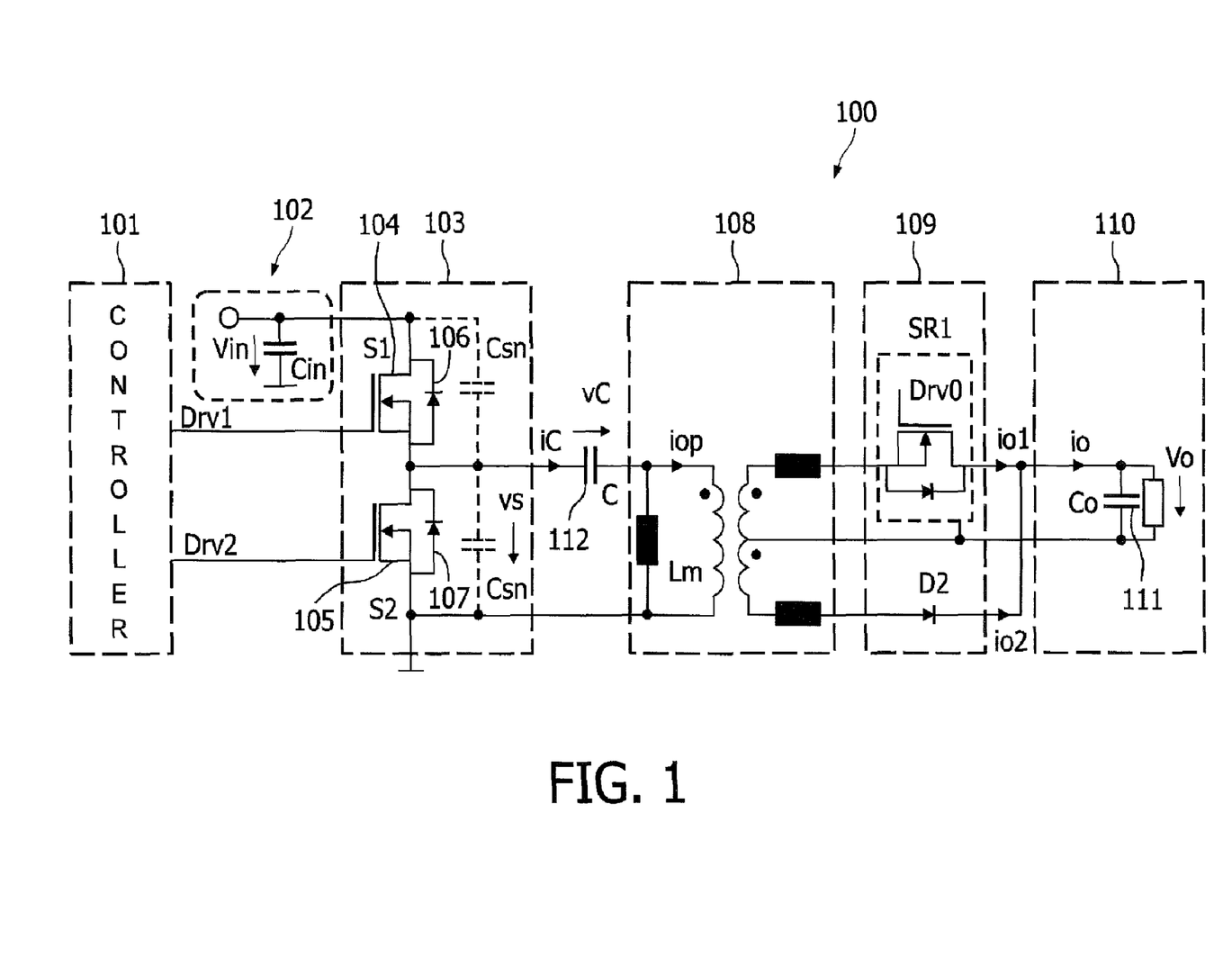
FIG. 1 shows a LLC converter to which a standby operation according to an exemplary embodiment may be applied.

FIG. 1 shows a resonant power supply 100 or LLC-converter to which the standby operation may be applied. The LLC-converter comprises an input filter (or dc-link) 102 and a half-bridge inverter 103 which is driven by signals drv1 and drv2 which are generated in a driver/controller unit 101. The half-bridge inverter 103 comprises a first transistor 104, a second transistor 105 and two diodes 106 and 107, wherein one is connected in parallel to the first transistor 104 and the other is connected in parallel to the second transistor 105. The half-bridge 103 is connected via a resonant capacity 112 to a primary side of a transformer 108 (or a group of individual inductive components). The half-bridge may further comprise additional capacities, like so-called snubber capacitors. On the secondary side the transformer 108 is connected to a rectifier unit 109, which can be formed either by diodes only or advantageously by at least one synchronous rectifier which is driven by a drive signal drv0. Furthermore, the rectifier unit 109 is connected to an output filter 110, i.e. voltage outputs. The output filter 110 preferably comprises a capacitor 111 ($C_o$) and may further comprise a so-called π-filter. Furthermore, a resistance 113 is shown in FIG. 1 which schematically illustrates a load, which is applied to the LLC-converter. In case MOSFETs are used as the first and second transistors the two diodes 106 and 107 may be formed by the diodes already integrated in the MOSFETS.

Furthermore, in FIG. 1 some physical observables are introduced. Vin refers to the voltage at the capacity Cin of the input filter. Two possible snubbers capacitors are labeled Csn, while vs refers to the voltage at the snubber capacitor in the low side of the half-bridge. The label iC refers to the current flowing via a capacity C which provides the resonant capacitor, while vC refers to the corresponding voltage. Lm refers to the inductivity of the transformer (mutual inductivity), while iop refers to the output current, reflected to the primary side of the transformer. On the secondary side of the transformer two circuits are depicted one of which having the rectifier unit 109 connected into. The labels io1 and io2 refer to the currents flowing to the respective circuits on the secondary side. Furthermore, labels io, Co and Vo refer to the current, the capacity and the voltage of the output filter, respectively. In total, the LLC-converter shown in FIG. 1 comprises six elements which can function as energy storing elements, i.e. the two inductivities and the capacity of the LLC-converter, the input and the output filters and the capacities of the switching elements of the half bridge.

Figure 11:
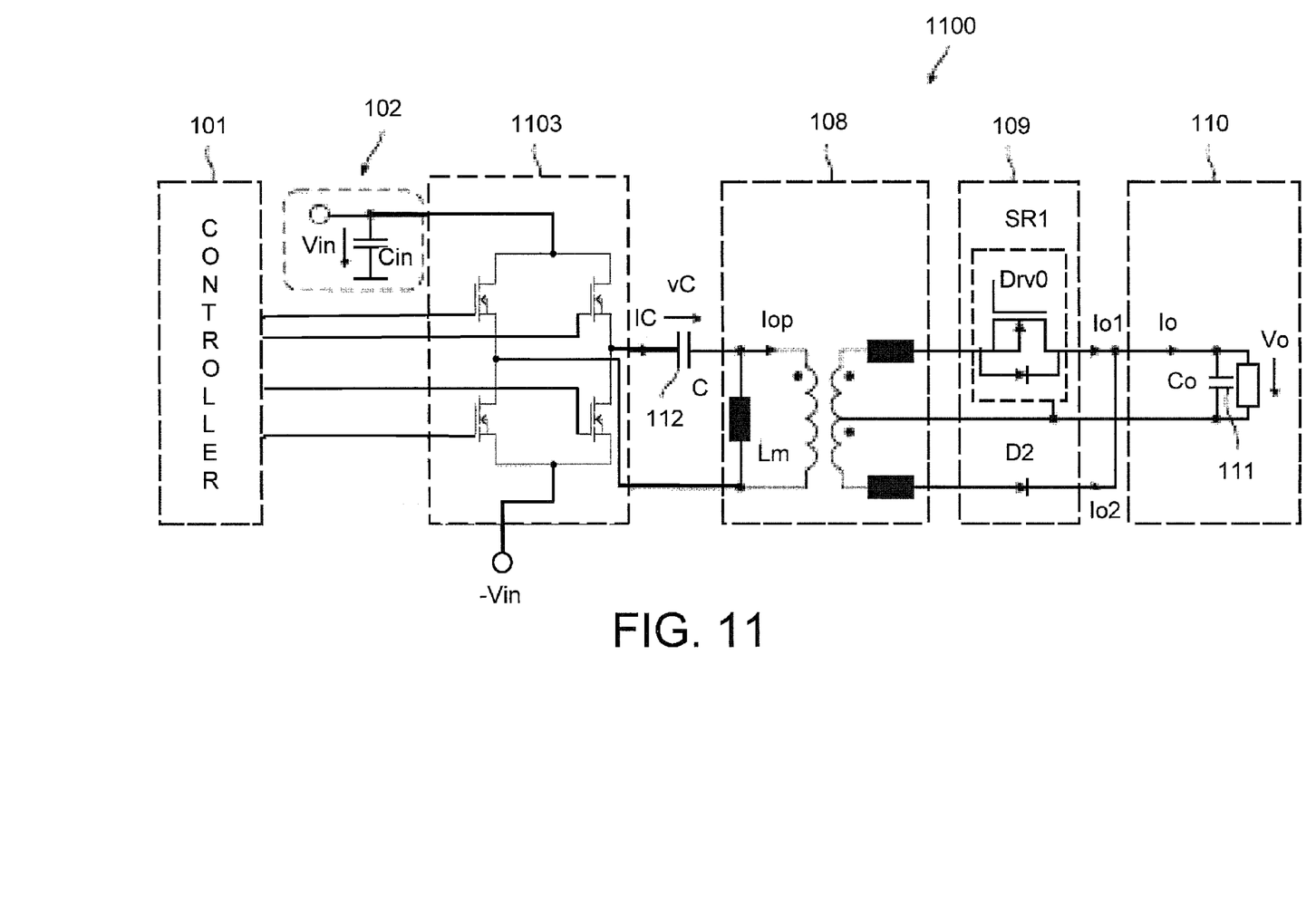
FIG. 11 schematically shows yet another LLC converter to which a standby operation according to an exemplary embodiment may be applied.

Beside the shown half-bridge a full-bridge can be used, as illustrated for example in FIG. 11 which illustrates an example converter 1100 with a full-bridge 1103. In case a full-bridge is used for the LLC converter the branch which is connected to ground in FIG. 1 will be connected to the so-called switch node of the half-bridge. Furthermore, the full-bridge may be switched cross like, i.e. the first transistor (lower branch) of the first half-bridge may be switched together with the second transistor (upper branch) of the second half-bridge, and vice versa. In this case the current may be zero, while the corresponding voltages of the two half-bridges may be +Vin and −Vin.

Figure 2:
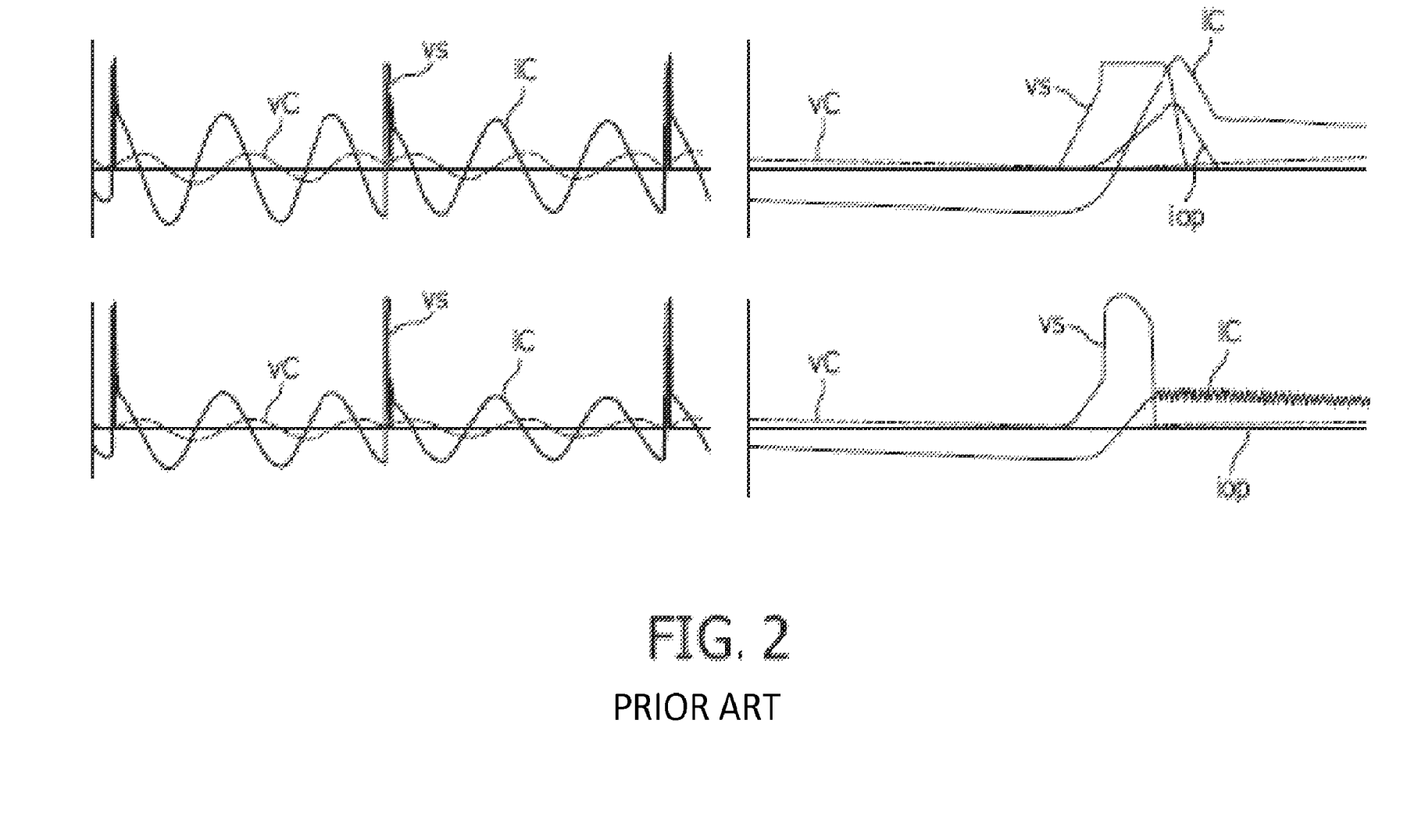
FIG. 2 schematically shows typical waveforms of continuous standby operation.

FIG. 2 schematically shows typical waveforms resulting from continuous sub-critical standby operation, i.e. of standby operations known in the prior art. In FIG. 2 two examples are schematically depicted. In the upper row the waveforms for a high load is shown, while in the lower row the standby load is reduced compared to the one shown in the upper row. This known mode shows sufficient efficiency only down to a certain standby load, e.g. about 500 mW. This value depends on the allowed minimum frequency, e.g. above audible frequency, the output capacitance of the switching elements including possible snubber capacitors, and on the conduction losses in the power train ($R_{dson}$, transformer and output circuits). The lower diagrams illustrate the case of virtually no-load operation, but keeping the output voltage(s) controlled. That is, the lower diagrams shows the reduction of the output power with respect to the upper by reducing the pulse duration, at a given minimum frequency, down to a value where no power is delivered anymore to the output. Here all the input power is dissipated, mainly due to "hard-switching", since the current iC in prior to the switching pulses becomes too small.

In detail the rows of FIG. 2 are divided into two diagrams, wherein the right one zooms those on the left in time around the switching pulse. Depicted in all diagrams are the voltages vC and vs and the current iC, wherein the labels refer to FIG. 1. From the diagrams on the right the consequences of the decrease of the pulse duration can be retraced, which pulse duration is shorter in the lower diagram than in the upper one. This leads to the fact that the current iC is smaller in the lower case than in the upper one and furthermore comprises some ripples. The current iop, referring to the current on the primary side is also greatly decreased.

Figure 3:
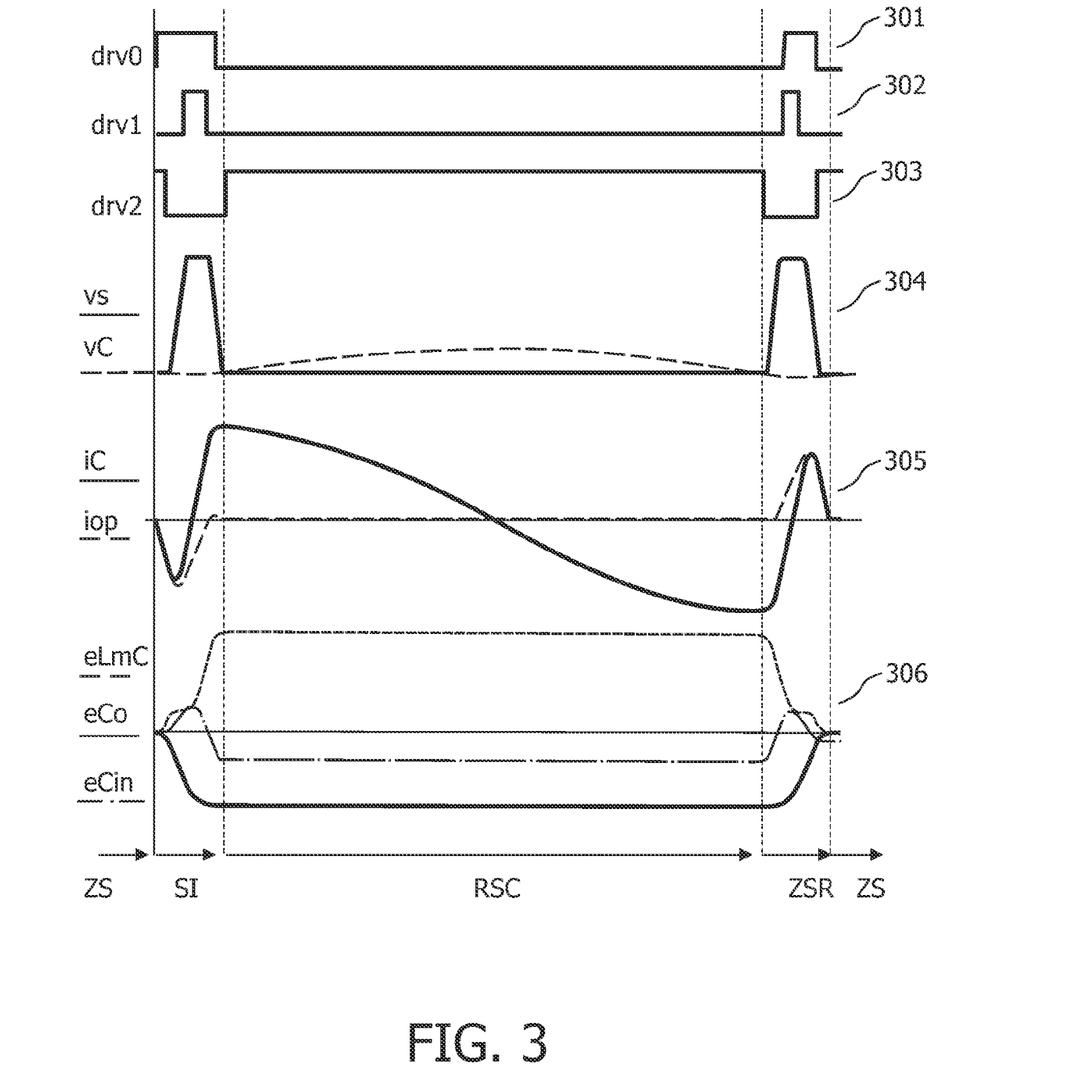
FIG. 3 schematically shows typical waveforms according to a first exemplary embodiment of the invention.

FIG. 3 schematically shows an overview of a standby operation sequence with its basic switching events, according to a first exemplary embodiment of the invention. FIG. 3 depicts six rows from which the timing of several physical parameters and switching events can be retraced. The first part of all of these rows refer to the initial state or Zero State (ZS), the next phase refers to the Standby Initialization phase (SI), which is followed by the Resonant State Commutation (RSC) and the Zero State Return phase (ZSR). The labels used in FIG. 3 are referring to the labels in FIG. 1. The first three rows 301, 302, and 303 of FIG. 3 refer to the driving or controlling signals drv0, drv1, and drv2, respectively, wherein drv0 refers to the driving signal applied to the rectifier unit of FIG. 1, drv1, refers to the driving signal applied to the first switching transistor 104 of the half-bridge, while drv2 refers to the driving signal applied to the second switching transistor 105 of the half-bridge. The next three rows depict the waveform of resulting power train variables. In particular, the fourth row 304 refers to the half-bridge switch node voltage vs and the resonant capacitor voltage vC. The fifth row 305 refers to the resonant capacitor current iC and output current iop, reflected to the primary side. The sixth row 306 refers to energies associated with the relevant tanks of the resonant converter. In particular, to energy of the in- and output capacitor eCin and eCo, respectively, and of the resonant elements mutual inductance Lm and resonant capacitance C shown as line eLmC in FIG. 3.

Prior to any switching, the resonant converter is supposed to be in Zero State (ZS), i.e. vC=0 and iC=0, while the low side switch of the half-bridge is conductive, i.e. the signal drv2 is positive. The following phase is the Standby Initializing (SI). This event is, e.g. caused by an unit, which can detect that the output voltage Vo is falling short of a given reference value Voref. The corresponding output rectifier 109 is a synchronous rectifier, which is switched on now, i.e. signal drv0 shows a positive value now. Current flows from the output filter 110 into the resonant circuit comprising resonant capacity C and mutual inductivity Lm. After a while, details are given in the following figures, the half-bridge is turned on, i.e. the signal drv1 is positive while signal drv2 is zero now. Leading to a switch on of the first transistor 104 and a switch off of the second transistor 105 with keeping a certain dead time. This is a soft switching action (ZVS) and therefore virtually loss less since sufficient inductive current has been flowing in advance.

After a short while the half-bridge is switched off again, drv2 is positive and drv1 is zero again, under ZVS condition again because the current iC, see fifth row 305, has commutated. The energy balance, sixth row 306, shows that both output and input filter have delivered energy to the resonant elements.

The next switching action follows after detecting Resonant State Commutation (RSC), i.e. half an oscillation period of the resonant oscillation, see iC in the fifth row 305. The half-bridge is again switched on and off under ZVS condition, see the upper three rows 301, 302 and 303. Only by the duration of the on-time Zero State Return (ZSR) is now possible. This means that all energy is transferred back to the output and input filters except a residual amount missing in the input filter due to losses during SI, RSC and ZSR phases. Compared to the operation shown in FIG. 2 and under equal conditions in terms of power train components and minimum switching (repetition) frequency, those losses are reduced by a factor of about five.

Figure 4:
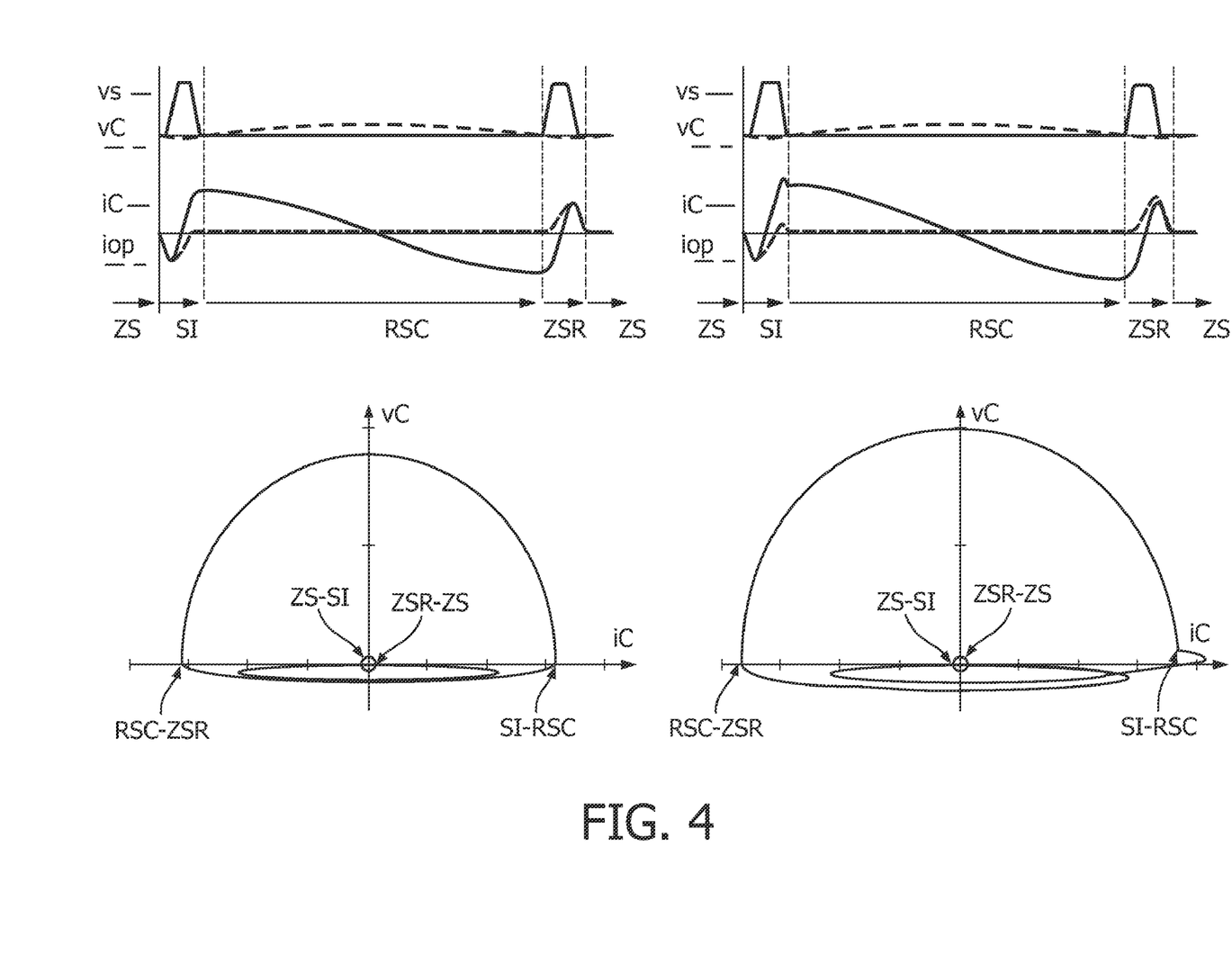
FIG. 4 schematically shows two examples of state space diagrams of standby operation.

FIG. 4 schematically shows two examples of state space diagrams of standby operation. In particular, FIG. 4 shows on the left side resulting waveforms for operation at virtually no load, and 25 μJ/cycle, diagrams on the right side. In the lower graphs, the resonant capacitor's voltage is plotted versus its currents. Thus, FIG. 4 compares standby operation for two examples (left and right diagrams) which differ in output power. The left side corresponds to the case shown in FIG. 3, i.e. having virtually zero output power, whereas the diagram on the right side refers to operation at about 500 mW at 20 kHz or about 5 mW at 200 Hz. The state space diagrams in the lower part of FIG. 4 further illustrate the operation. In the corresponding state space diagrams the voltage vC and the current iC corresponding to the main capacity C is depicted for the different phases of the upper diagrams, i.e. ZS, SI, RSC and ZSR phase. Zero State corresponds to the origin of the coordinate vC and iC. It is obvious that the amount of energy converted per cycle as well as achieving ZS in the end is a matter of timing.

Figure 5:
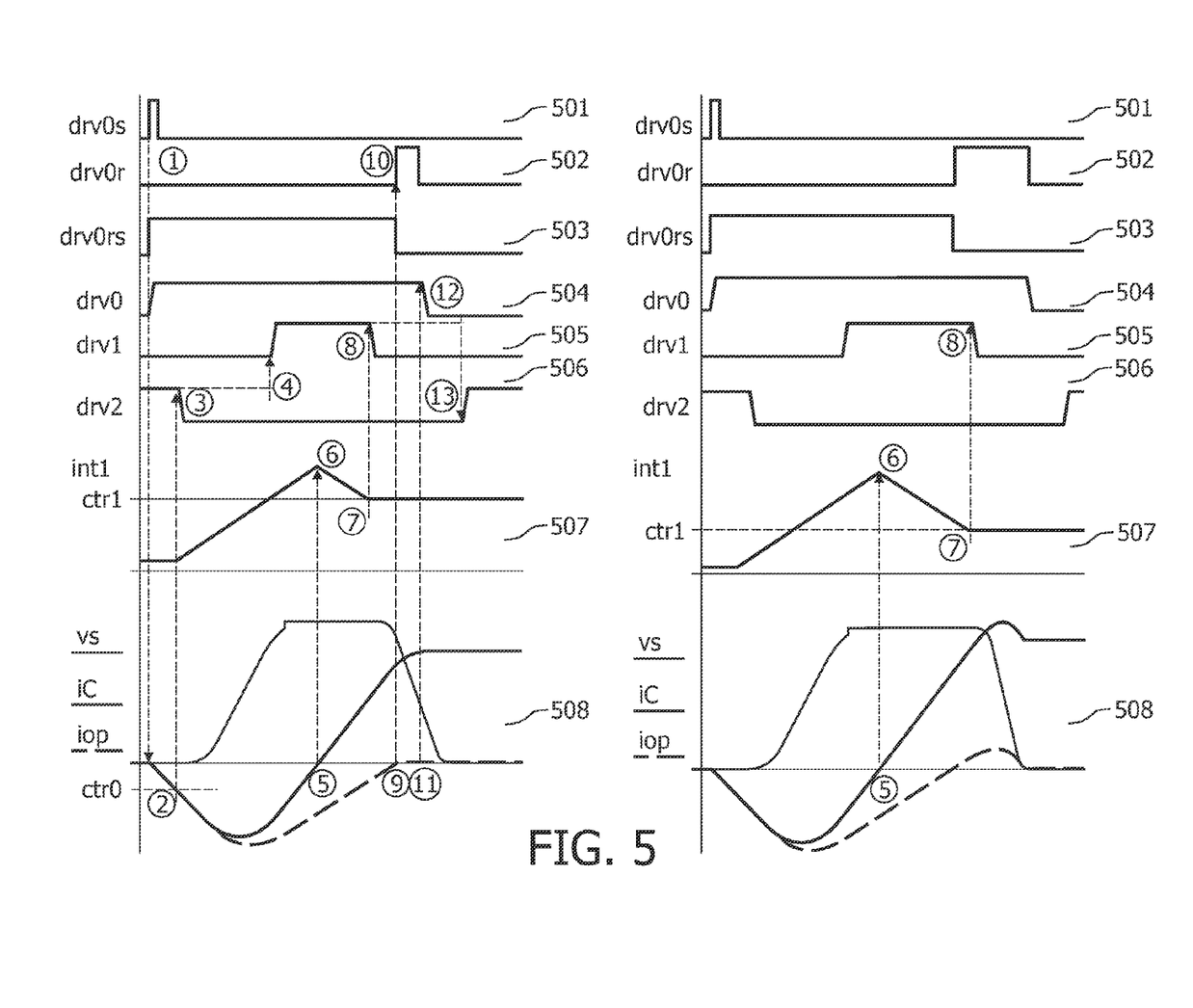
FIG. 5 schematically shows the standby initialization phase of FIG. 3 in greater detail.

FIG. 5 schematically shows the standby initialisation phase of FIG. 3 in greater detail. In particular FIG. 5 shows the controlling signals and resulting waveforms for the two cases of FIG. 4, i.e. the low output case on the left side and the high output case on the right side. The variable which determines the energy delivered to the output is labeled ctrl in FIG. 5.

FIG. 5 describes a way how the timing signals in the standby initialisation phase Si may be derived for the examples given in FIG. 4. The upper four traces (rows) 501, 502, 503 and 504 refer to the synchronous rectifier block 109 (RS) of FIG. 1. This block comprises a MOSFET which is switched on and off by the signal drv0, which is depicted in the fourth row 504 in FIG. 5. The block further comprises additional signal processing to overwrite the normal synchronous rectifier operation which is driven by driving signal drv0 which is shown in second row 502 in FIG. 5. Therefore, a pulse drv0s is generated, which is shown in the first row 501, if the output voltage Vo falls short of a given reference value, which point in time is marked with the label 1 in FIG. 5 (event 1). The signal drv0s sets a RS flip-flop drv0rs, which is shown in the third row 503 of FIG. 5. So the synchronous rectifier is driven conductive, i.e. signal drv0 is high, either by normal SR control, e.g. when detecting the source-to-drain voltage to rise above a given level, or by the RS flip-flop. The flip-flop is reset by signal drv0r, shown in the second row 502. The RS block is shown in more detail in FIG. 6.

The signals drv1 and drv2 are the gate signals driving the half-bridge switches S1 and S2 labeled 104 and 105 in FIG. 1. The signals drv1 and drv2 are shown in the fifth and sixth row 505 and 506, respectively, of FIG. 5. Prior to phase SI switch S2, i.e. the second switching transistor 105 in FIG. 1, is conductive. It is switched off at the time point which is marked with the label 3 in FIG. 5 (event 3), if the primary current iC, which is shown in the eighth row 508, falls short of a preset value ctr0, which point in time is marked with the label 2 (event 2) in FIG. 5, as a consequence of event 1. At this time an integrator starts ramping up (int1) which is shown in the seventh row 507 of FIG. 5. After a dead time, which is preset for example, switch S1 (first switching transistor 104 in FIG. 1) is turned on, which is marked with the label 4 (event 4) in FIG. 5. Due to the fact that current iC commutates a positive zero crossing can be detected, which is marked with label 5 (event 5) in FIG. 5. At that point the integrator inverts its slope, which is marked with the label 6 (event 6) in FIG. 5, and ramps down until it reaches the threshold level ctrl, which is marked with the label 7 (event 7) in FIG. 5. At this point S1 is switched off, which is marked with the label 8 (event 8) in FIG. 5, and after a dead time S2 is switched on again, which is marked with the label 13 (event 13) in FIG. 5. The SR detects normal rectification condition and the output current becomes positive, which is marked with the label 9 (event 9) in FIG. 5, and drv0r gets high. This resets the flip-flop drv0rs and when the output current becomes zero, which is marked with the label 11 (event 11) in FIG. 5, the SR switch finally is turned off, which is marked with the label 12 (event 12) in FIG. 5.

On the right of FIG. 5 the same waveforms are plotted but now as resulting from a reduced value ctr1, i.e. the threshold level for the inverter int1. This causes the transferred energy to be higher at the end of standby switching action, i.e. after ZSR phase (cf. FIG. 8). Variation of ctr1 is therefore a first method to control the standby power. If e.g. the minimum switching frequency should not fall short of a preset value, or a maximum time between the switching sequences should not be exceeded, ctr1 can be increased so far until this frequency is obtained.

Another way to control the output power is to keep ctr1 constant, which means that a certain energy is delivered per sequence. Since the switching sequences occur only "on demand", i.e. are triggered by the secondary side SR conduction, frequency depends on the output power here. A third method to control the output power will be explained in connection with FIG. 9.

Figure 6:
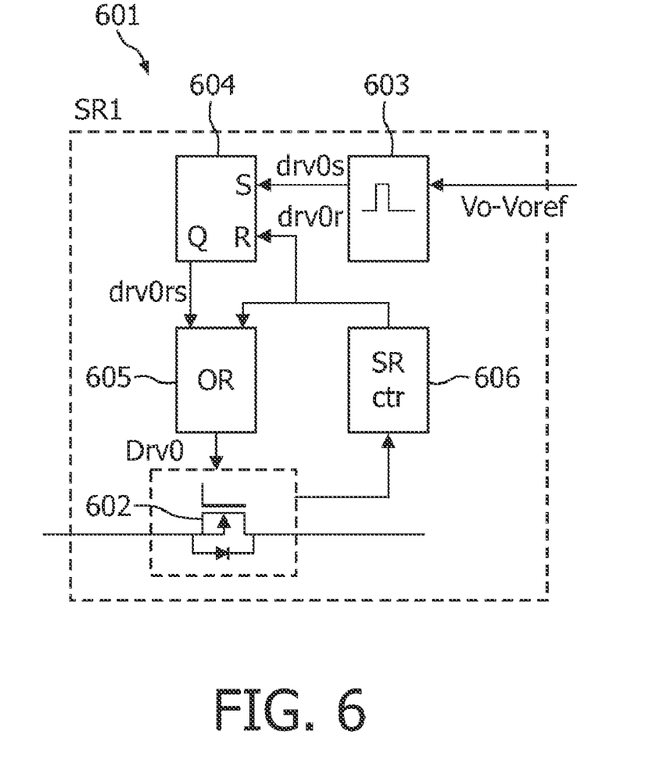
FIG. 6 schematically shows a rectifier block which is modified when compared to typically known rectifier blocks and which is usable in an LLC depicted in FIG. 1.

FIG. 6 shows schematically a modified synchronous rectifier block. The rectifier block 601 comprises a MOSFET 602. Further, it comprises a driving unit 603 which generates a pulse drv0s when the output voltage Vo of the resonant converter falls below a given reference value Voref. The pulse signal drv0s sets a RS flip-flop 604 which generate a drive signal drv0rs which is inputted into an OR-Gate 605. A second input to the OR-Gate is connected to a normal SR control unit 606, which is also connected to the flip-flop and generate a drv0r driving signal, which may overwrite the normal SR operation. The output signal drv0 of the OR-Gate 605 is provided to gate of the MOSFET 602.

Figure 7:
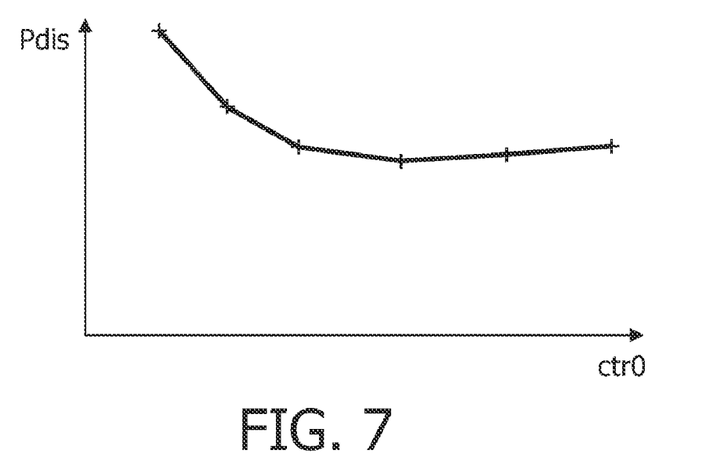
FIG. 7 schematically shows total losses as a function of a switching threshold.

FIG. 7 schematically shows total losses in standby operation as of FIG. 5 as a function of the parameter ctr0. The shown graph indicates that there is an optimum value of ctr0, which determines the threshold of current iC to detect event 2 of FIG. 5 (phase SI) and depends mainly on the output capacities of the switches S1 and S2 and possible snubber capacitors Csn. Alternatively to detecting event 2 by sensing iC, vC can be sensed in order to process its derivative, which again is proportional to iC.

Figure 8:
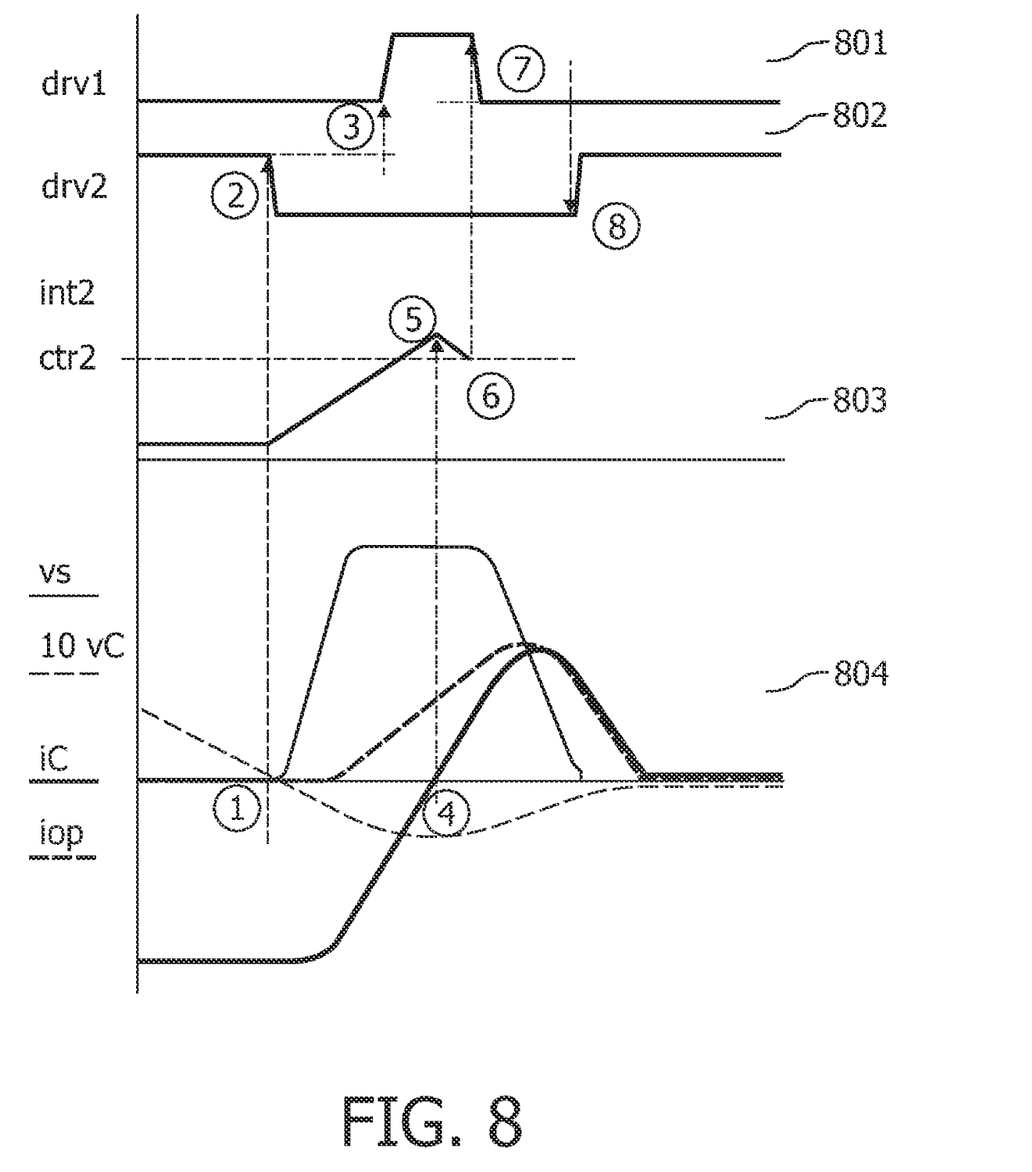
FIG. 8 schematically shows the Zero State Return phase of FIG. 3 in greater detail.
Figure 9:
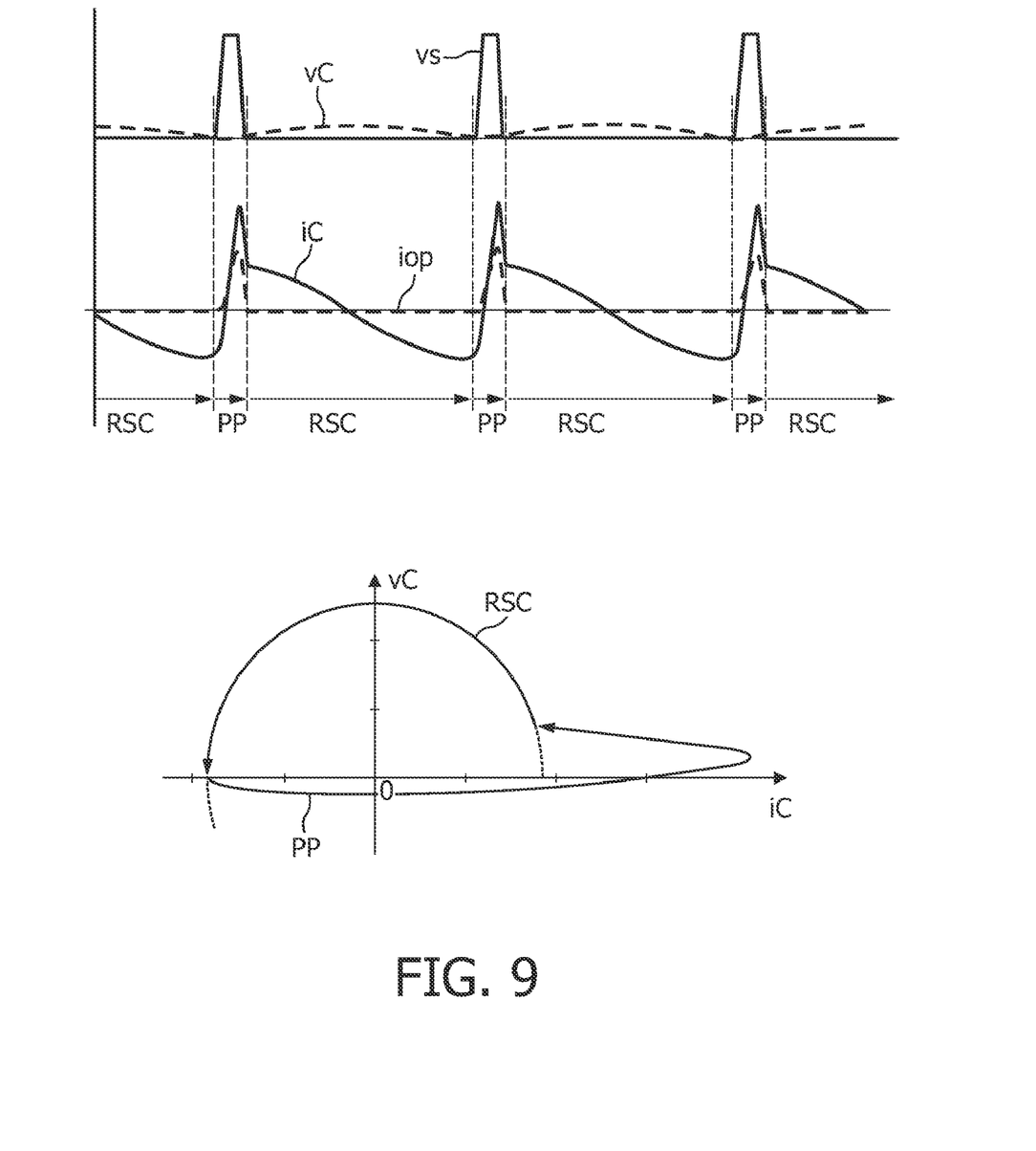
FIG. 9 schematically shows an exemplary embodiment of inserting power pulses into a method of operating a resonant power converter.

FIG. 8 schematically depicts a way to arrange for Zero State Return switching in order to achieve zero state at the end of the sequence. In particular, FIG. 9 shows the controlling signals and resulting waveforms. The variable which is adjusted to achieve ZS is ctr2. In the first two rows 801 and 802 of FIG. 8 the driving signals drv1 and drv2, respectively are shown. The ZSR phase starts with detecting a negative zero crossing of voltage vC, which is marked with the label 1 (event 1) in FIG. 8 and which is depicted in a fourth row 804 of FIG. 8. Furthermore, the half-bridge switch node voltage vs, the resonant capacitor current iC and the output current iop, reflected to the primary side are depicted. Then S2 is switched off, which is marked with the label 2 (event 2) in FIG. 8, and after a dead time S1 is switched on, which is marked with the label 3 (event 3) in FIG. 8. Event 2 further causes an integrator to ramp up, which signal is shown in a third row 803 of FIG. 8, which inverts its slope, which is marked with label 5 (event 5) in FIG. 8, at positive zero crossing detection of iC, which is marked with label 4 (event 4) in FIG. 8. After ramping down to value ctr2, which is marked with label 6 (event 6) in FIG. 8, the S1 is switched of, which is marked with label 7 (event 7) and S2 is turned on again after a dead time, which is marked with label 8 (event 8) in FIG. 8. The value of ctr2 mainly depends on the dead times. However, it may be an internal value of the controlling means which is adjusted by sampling the voltage vC at or shortly after event 8. In case of vC is then below zero, ctr2 is increased and vice versa.

FIG. 9 schematically shows a third kind of pulses (phases) that may be used in standby operation. These third kind of pulses may be the most efficient way to increase output power is inserting this third kind of pulses, so-called power pulses (PP) or power phases, between Standby Initialization phase (SI) and Zero State Return (ZSR). These PP shows zero voltage switching as well but they do not end in Zero State (ZS) but at a certain level of current iC which is shown the second row 902 of FIG. 9, and which certain level in turn is determined by the pulse duration, i.e. on-time of S1. That time may be constant here. The on-time of S2, i.e. the duration of RSC, is given again by detecting the first negative zero crossing of vC. These pulses can be inserted between SI and ZSR phase as described in FIG. 3 and using a fixed value for ctr1 as well. Then the energy delivered by the resulting sequence SI-RSC-n-time (PP-RSC)-ZSR is determined by n only which is a positive integer or zero.

An advantage of operating at n>0 is that the efficiency of the pulse sequence PP-RSC is higher than resulting from SI-RSC-ZSR only, which is illustrated by the state space diagram in FIG. 9. Here, the ratio of energy transferred to the output to that oscillating only is increased compared to the example given in FIG. 4 on the right.

Since this sequence is triggered as well by SR action on the secondary (event 1 in FIG. 5) the repetition frequency depends on n, at given output power, output filter capacitance, and maximum voltage ripple. An example may illustrate these relations: Vo=5V, Co=100 µF, $\Delta$vo=2% (ripple), Po=100 mW (output power), the energy transferred by a sequence with n=2 may be 100 µJ, which yields a frequency of 1 kHz.

Equivalent operations as described so far can be also performed at inverted signals drv1 and drv2 when changing positions of S2 and SR1 in FIG. 1. Then zero state corresponds to iC=0 but vC=Vin.

Figure 10:
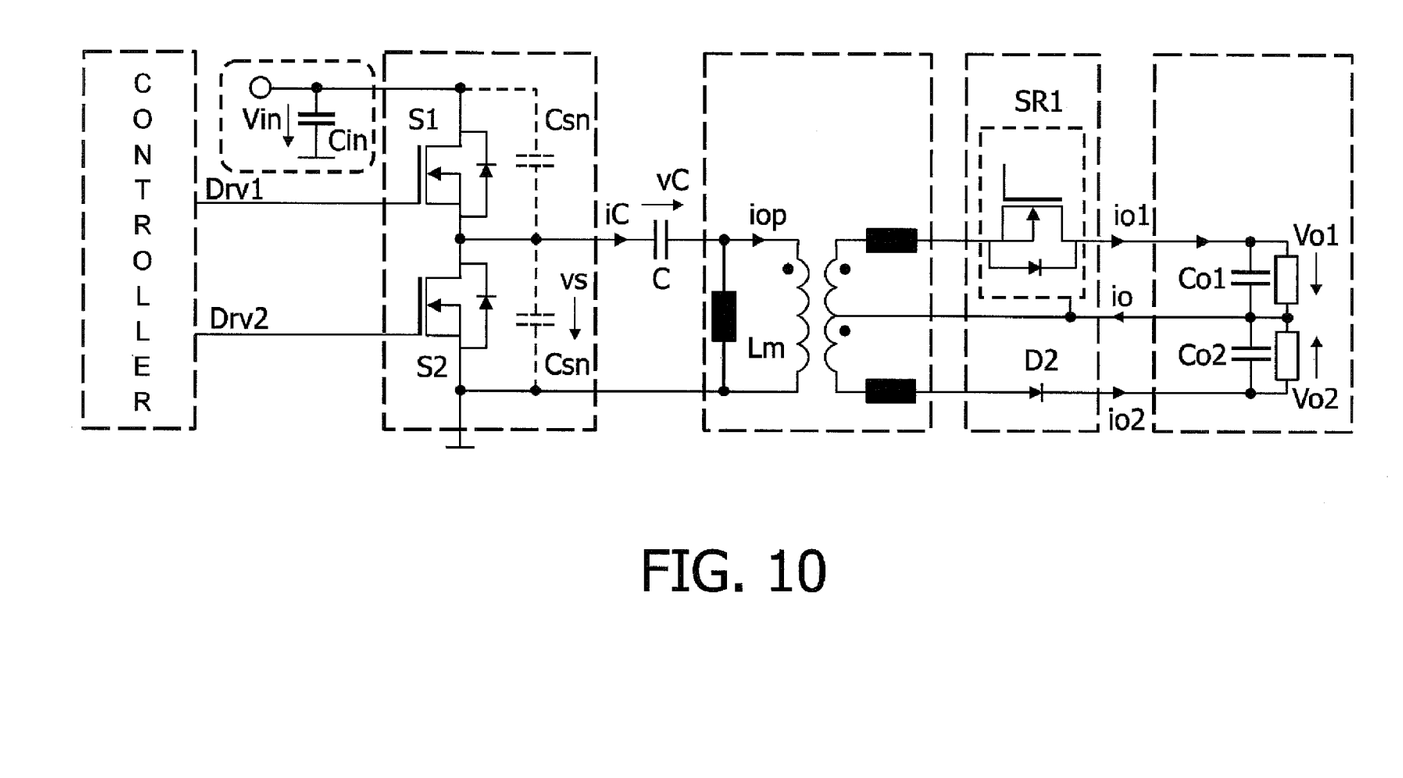
FIG. 10 schematically shows another LLC converter to which a standby operation according to an exemplary embodiment may be applied.

FIG. 10 schematically shows another LLC converter to which a standby operation according to an exemplary embodiment may be applied. The LLC converter with synchronous rectifier shown in FIG. 10 has half-wave rectified outputs with the synchronous rectifier in one of these outputs. The operation described so far can further be applied to the resonant converter shown in FIG. 10. It differs from the converter shown in FIG. 1 in its output rectifier configuration. While in FIG. 1 the output Vo is energized by both the rectified half-waves, the converter in FIG. 10 shows two outputs Vo1 and Vo2, which are energized subsequently by corresponding half-waves of the output current io. In a preferred configuration, only one output is matter of the standby operation as described above. Both outputs however, maybe standby-supplied as well, if periodically switching between normal and inverted operation.

The foregoing merely illustrates the principles of the invention. It will thus be appreciated that those skilled in the art will be able to devise various arrangements which, although not explicitly described or shown herein, embody the principles of the invention and are thus within its spirit and scope. For example, one of ordinary in the art will recognize that the particular structures shown in the figures are presented for ease of understanding, and that the functions of the various blocks may be performed by other blocks.

In particular, it should be noted that the embodiments described above may be altered in that way that the Standby Initializing phase may be performed in such a way that the upper transistor 104 shown in FIG. 1 is switched on before the Standby Initializing, i.e. in the Zero State, and in the Standby Initializing Phase the first transistor 104 is switched off, while the second transistor 105 is switched on by using soft-switching. That is, in general the functions of the first and the second transistors are exchanged. This may lead to some differences to the above described implementation and effects which are readily apparent for a person skilled in the art.

For example, the rectifier 109 shown in FIG. 1 will be implemented in the lower branch of the secondary side of the transformer. As a consequence of the exchange of the functions, the state space diagrams, e.g. FIG. 4, will be rotated by 180° and shifted by Vin. In particular, the energy still continuously oscillates between different resonant elements of the LLC converter, e.g. the inductivity and the capacity of the LLC converter, but the sum of the energy stored in the inductivity and the capacity may not equal zero.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

These and other embodiments will be evident to one ordinary in the art in view of this disclosure, and are included within the scope of the following claims.

The invention claimed is:

1. A method of operating a resonant power supply comprising a first switching element, a resonant circuit, including a transformer, connected to an output of the first switching element, and a rectifier having an input side connected to an output of the transformer and an output side for delivering output power to a load; the method comprising:
   discontinuously switching the first switching element; and
   initializing a standby operation by transferring energy to the first switching element from at least one energy storing element provided at the output side of the rectifier; and
   soft-switching the first switching element.

2. The method according to claim 1, wherein the soft-switching is a zero voltage switching.

3. The method according to claim 1, wherein the rectifier comprises a second switching element and wherein the resonant power supply further comprises an output filter including the at least one energy storing element, wherein the energy is transferred from the at least one energy storing element to the first switching element by switching the second switching element.

4. The method of claim 3, wherein immediately prior to switching the second switching element, no energy is stored in the resonant circuit.

5. The method according to claim 1, further comprising controlling a switching operation of the resonant power supply to have a Resonant State Commutation phase.

6. The method according to claim 5, wherein, during the Resonant State Commutation phase, a current flowing through the resonant power current is reversed.

7. The method according to claim 5, further comprising increasing an output power of the resonant power supply by applying a power pulse, wherein the controller switches the first switching device for the power pulse.

8. The method according to claim 7, wherein the power pulse is inserted after the Resonant State Commutation phase.

9. The method of claim 5, wherein the Resonant State Commutation phase corresponds to half of a period of a resonant frequency of the resonant circuit.

10. The method according to claim 1, further comprising controlling a switching operation of the resonant power supply to have a Zero State Return phase.

11. The method according to claim 10, wherein in the Zero State Return phase an initial state of the resonant power supply is recovered.

12. The method according to claim 10, wherein, during the Zero State Return phase, the energy transferred in the initialization is substantially returned to the at least one energy storing element.

13. A resonant power supply, comprising:
   a first switching element;
   a resonant circuit including a transformer, the resonant circuit being connected to an output of the first switching element;
   a rectifier having an input side connected to an output of the transformer and an output side for delivering output power to a load;
   at least one energy storing element provided at the output side of the rectifier; and
   a controller configured to control a switching operation of the first switching element to be discontinuous,
   wherein the resonant power supply is configured to transfer energy initializing a standby operation from the at least one energy storing element to the first switching element in such a way that the first switching is soft switched.

14. The resonant power supply of claim 13, wherein the rectifier comprises a second switching element and wherein the resonant power supply further comprises an output filter including the at least one energy storing element, wherein the controller is configured to control a switching operation of the second switching element to initialize the energy transfer from the at least one energy storing element to the first switching element.

15. The resonant power supply according to claim 14, wherein the rectifier is a synchronous rectifier.

16. The resonant power supply according to claim 14, further comprising: a second output filter, wherein the resonant power supply is adapted to supply both output filters during the standby operation.

17. The resonant power supply of claim 14, wherein the controller controls an operation of the second switching element such that immediately prior to switching the second switching element, no energy is stored in the resonant circuit.

18. The resonant power supply of claim 14, wherein the controller controls the switching operations of the first and second switching elements to produce a repetitive pattern or four phases comprising a Zero State phase, immediately followed by a Standby Initialization phase, immediately followed by a Resonant State Commutation phase, immediately followed by a Zero State Return phase,
   wherein the first and second switching devices are switched during the Standby Initialization phase and the Zero State Return phase,
   wherein during the Zero State phase no energy is stored in the resonant circuit,
   wherein during the Standby Initialization phase the energy is transferred to the first switching element from the at least one energy storing element connected to the output side of the transformer;

wherein during the Resonant State Commutation phase, a current flowing through the resonant power supply experiences a reversal in direction; and wherein during the Zero State Return phase, the energy transferred in the Standby Initialization phase is substantially returned to the at least one energy storing element.

19. The resonant power supply according to claim 13, wherein the resonant power supply is an LLC-converter comprising a half-bridge or a full-bridge.

20. A method of operating a resonant power supply comprising a first switching element, a resonant circuit, including a transformer, connected to an output of the first switching element, and a rectifier having an input side connected to an output of the transformer and an output side for delivering output power to a load; the method comprising:

controlling the resonant power supply to operate with a repetitive pattern or four phases comprising a Zero State phase, immediately followed by a Standby Initialization phase, immediately following by a Resonant State Commutation phase, immediately followed by a Zero State Return phase, wherein the first switching device is switched during the Standby Initialization phase and the Zero State Return phase, wherein during the Zero State phase no energy is stored in the resonant circuit, wherein during the Standby Initialization phase energy is transferred to the first switching element from at least one energy storing element provided at the output side of the rectifier;

wherein during the Resonant State Commutation phase, a current flowing through the resonant power supply experiences a reversal in direction; and wherein during the Zero State Return phase, the energy transferred in the Standby Initialization phase is substantially returned to the at least one energy storing element.

* * * * *